United States Patent
Kim

(10) Patent No.: US 11,530,745 B2
(45) Date of Patent: Dec. 20, 2022

(54) METHOD AND DEVICE FOR FILTERING TARGET TRANSMISSION RATIO OF CONTINUOUSLY VARIABLE TRANSMISSION FOR VEHICLE

(71) Applicants: HYUNDAI MOTOR COMPANY, Seoul (KR); Kia Corporation, Seoul (KR)

(72) Inventor: Sejin Kim, Suwon-si (KR)

(73) Assignees: HYUNDAI MOTOR COMPANY, Seoul (KR); Kia Corporation, Seoul (KR)

(*) Notice: Subject to any disclaimer, the term of this patent is extended or adjusted under 35 U.S.C. 154(b) by 0 days.

(21) Appl. No.: 17/395,720

(22) Filed: Aug. 6, 2021

(65) Prior Publication Data

US 2022/0178438 A1 Jun. 9, 2022

(30) Foreign Application Priority Data

Dec. 3, 2020 (KR) .................. 10-2020-0167434

(51) Int. Cl.
*F16H 59/44* (2006.01)
*F16H 59/18* (2006.01)
*F16H 61/662* (2006.01)
*F16H 59/70* (2006.01)
*F16H 61/00* (2006.01)

(52) U.S. Cl.
CPC .......... *F16H 59/44* (2013.01); *F16H 59/18* (2013.01); *F16H 59/70* (2013.01); *F16H 61/662* (2013.01); *F16H 2059/704* (2013.01); *F16H 2061/0075* (2013.01)

(58) Field of Classification Search
CPC .......... F16H 59/18; F16H 59/44; F16H 59/70; F16H 2059/704; F16H 61/662; F16H 2061/0075
See application file for complete search history.

(56) References Cited

U.S. PATENT DOCUMENTS

| 11,092,202 B2* | 8/2021 | Arai ................. F16H 57/0489 |
| 2019/0271393 A1* | 9/2019 | Hattori ............. F16H 61/66259 |
| 2021/0215248 A1* | 7/2021 | Matsuo .................. F16H 61/12 |

* cited by examiner

*Primary Examiner* — Edwin A Young
(74) *Attorney, Agent, or Firm* — Lempia Summerfield Katz LLC

(57) ABSTRACT

A method of filtering a target transmission ratio of a continuously variable transmission of a vehicle includes: controlling, by a controller, a vehicle speed filter configured to filter a speed signal of a vehicle distorted due to vibration of the vehicle; controlling, by the controller, a target driving pulley speed memory configured to output a target driving pulley speed signal of the continuously variable transmission based on an output value of an acceleration pedal sensor and the filtered speed signal of the vehicle; and controlling, by the controller, a transmission calculator configured to calculate a target transmission ratio of the continuously variable transmission that is a stable value based on the target driving pulley speed signal of the continuously variable transmission and the filtered speed signal of the vehicle, wherein the vehicle speed filter increases filtering capability and a response speed of the vehicle speed filter and decreases the speed signal of the vehicle to a value that makes the target transmission ratio of the continuously variable transmission stable.

16 Claims, 4 Drawing Sheets

METHOD AND DEVICE FOR FILTERING TARGET TRANSMISSION RATIO OF CONTINUOUSLY VARIABLE TRANSMISSION FOR VEHICLE

CROSS-REFERENCE TO RELATED APPLICATION

This application claims priority to and the benefit of Korean Patent Application No. 10-2020-0167434, filed on Dec. 3, 2020, the entire contents of which are incorporated herein by reference.

FIELD

The present disclosure relates to a continuously variable transmission of a vehicle.

BACKGROUND

The statements in this section merely provide background information related to the present disclosure and may not constitute prior art.

A transmission of a vehicle has a function of transmitting rotatory power of an engine to driving wheels, and the transmission is divided into a manual transmission in which a driver directly selects a shift stage at a driver's will, an automatic transmission in which shifting is automatically performed according to a driving condition of a vehicle, and a continuously variable transmission in which continuously variable shifting is performed without a specific shift region between each shift stage.

The continuously variable transmission is the transmission which is capable of achieving a continuous transmission ratio by using a belt, instead of a gear, and is abbreviated as CVT.

The continuously variable transmission is the transmission which implements a transmission ratio with a change in a diameter according to a driven pulley pressure input to a driven pulley and a driving pulley pressure input to a driving pulley, and transmits power between the driving pulley and the driven pulley through a friction of the belt.

The continuously variable transmission changes the diameters of the driving pulley and the driven pulley in order to provide a transmission ratio, and hydraulic pressure supplied for changing the diameters of the driving pulley and the driven pulley is supplied through an operation of a solenoid valve and a spool valve.

The continuously variable transmission uses a line pressure (or pump pressure) as source pressures of the driven pulley pressure and the driving pulley pressure, and controls the line pressure by combining the solenoid valve or the spool valve.

The above information disclosed in this Background section is only for enhancement of understanding of the background of the disclosure, and therefore it may contain information that does not form the prior art that is already known to a person of ordinary skill in the art.

SUMMARY

The present disclosure provides a method and a device for filtering a target transmission ratio of a continuously variable transmission of a vehicle, which stabilize a target transmission ratio by suppressing undesired distortion of a vehicle speed signal due to vibration of a vehicle to improve a feeling of shifting of the vehicle, fuel efficiency of the vehicle, or durability of the vehicle.

An exemplary form of the present disclosure provides a method of filtering a target transmission ratio of a continuously variable transmission (CVT) of a vehicle, the method including: controlling, by a controller, a vehicle speed filter configured to filter a speed signal of a vehicle distorted due to vibration of the vehicle; controlling, by the controller, a target driving pulley speed memory configured to output a target driving pulley speed signal of the continuously variable transmission based on an output value of an acceleration pedal sensor and the filtered speed signal of the vehicle; and controlling, by the controller, a transmission calculator configured to calculate a target transmission ratio of the continuously variable transmission that is a stable value based on the target driving pulley speed signal of the continuously variable transmission and the filtered speed signal of the vehicle, wherein the vehicle speed filter increases filtering capability and a response speed of the vehicle speed filter and decreases a size of the speed signal of the vehicle to a size that makes the target transmission ratio of the continuously variable transmission have a stable value.

The speed signal of the vehicle may correspond to a driven pulley speed signal of the CVT.

When a speed of the vehicle at a current control period is equal to or larger than a value obtained by summing the filtered speed of the vehicle calculated by a filtering method of the vehicle speed filter at a control period immediately before the current control period and a minimum limit value of a change amount of the speed of the vehicle, and is equal to or less than a value obtained by summing the filtered speed of the vehicle calculated by a filtering method of the vehicle speed filter at a control period immediately before the current control period and a maximum limit value of the change amount of the speed of the vehicle, the vehicle speed filter may determine the filtered speed of the vehicle at the current control period as the speed of the vehicle at the current control period by performing a first filtering method among the filtering methods of the vehicle speed filter, and the minimum limit value may be determined based on a differential value of the speed of the vehicle at the current control period and a first filter coefficient that makes the target transmission ratio of the continuously variable transmission have a stable value, and the maximum limit value may be determined based on the differential value of the speed of the vehicle at the current control period and a second filter coefficient that makes the target transmission ratio of the continuously variable transmission have a stable value. When the speed of the vehicle at a current control period is less than the value obtained by summing the filtered speed of the vehicle calculated by the filtering method of the vehicle speed filter at the control period immediately before the current control period and the minimum limit value, the vehicle speed filter may determine the value obtained by summing the filtered speed of the vehicle calculated by the filtering method of the vehicle speed filter at the control period immediately before the current control period and the minimum limit value as the filtered speed of the vehicle at the current control period by performing the first filtering method. When the speed of the vehicle at a current control period is greater than the value obtained by summing the filtered speed of the vehicle calculated by the filtering method of the vehicle speed filter at the control period immediately before the current control period and the maximum limit value, the vehicle speed filter may determine the value obtained by summing the filtered speed of the vehicle calculated by the filtering method of the vehicle speed filter at the control period immediately before the current control period and the maximum limit value as the filtered speed of the vehicle at the current control period by performing the first filtering method. When the value obtained by subtracting the speed of the vehicle at the current control period from the filtered speed of the vehicle calculated by the filtering method of the vehicle speed filter at the current control period is greater than a third filter coefficient, the vehicle speed filter may determine a value obtained by summing the speed of the vehicle at the current control period and the third filter coefficient as the filtered speed of the vehicle at the current control period by performing a second filtering method among the filtering methods of the vehicle speed filter, and the third filter coefficient may be the value that makes the target transmission ratio of the continuously variable transmission have a stable value. When the value obtained by subtracting the speed of the vehicle at the current control period from the filtered speed of the vehicle calculated by the filtering method of the vehicle speed filter at the current control period is less than the negative third filter coefficient, the vehicle speed filter may determine a value obtained by subtracting the third filter coefficient from the speed of the vehicle at the current control period as the filtered speed of the vehicle at the current control period by performing the second filtering method.

The transmission ratio calculator may calculate the target transmission ratio by using a value obtained by dividing a value of the target driving pulley speed signal by a value of a filtered driven pulley speed signal of the continuously variable transmission corresponding to the filtered speed signal of the vehicle.

Another exemplary form of the present disclosure provides a device for filtering a target transmission ratio of a continuously variable transmission (CVT) of a vehicle, the device including: a vehicle speed filter configured to filter a speed signal of a vehicle distorted due to vibration of the vehicle; a target driving pulley speed memory configured to output a target driving pulley speed signal of the continuously variable transmission based on an output value of an acceleration pedal sensor and the filtered speed signal of the vehicle; a transmission ratio calculator configured to calculate a target transmission ratio of the continuously variable transmission based on the target driving pulley speed signal of the continuously variable transmission and the filtered speed signal of the vehicle; and a controller configured to control an operation of the vehicle speed filter, an operation of the target driving pulley speed memory, and an operation of the transmission ratio calculator, wherein the vehicle speed filter increases filtering capability and a response speed of the vehicle speed filter and decreases a size of the speed signal of the vehicle to a size that makes the target transmission ratio of the continuously variable transmission have a stable value.

The speed signal of the vehicle may correspond to a driven pulley speed signal of the CVT.

When a speed of the vehicle at a current control period is equal to or greater than a value obtained by summing the filtered speed of the vehicle calculated by a filtering method of the vehicle speed filter at a control period immediately before the current control period and a minimum limit value of a change amount of the speed of the vehicle, and is equal to or less than a value obtained by summing the filtered speed of the vehicle calculated by a filtering method of the vehicle speed filter at a control period immediately before the current control period and a maximum limit value of the change amount of the speed of the vehicle, the vehicle speed filter may determine the filtered speed of the vehicle at the current control period as the speed of the vehicle at the current control period by performing a first filtering method among the filtering methods of the vehicle speed filter, and the minimum limit value may be determined based on a differential value of the speed of the vehicle at the current control period and a first filter coefficient that makes the target transmission ratio of the continuously variable transmission have a stable value, and the maximum limit value may be determined based on the differential value of the speed of the vehicle at the current control period and a second filter coefficient that makes the target transmission ratio of the continuously variable transmission have a stable value. When the speed of the vehicle at a current control period is less than the value obtained by summing the filtered speed of the vehicle calculated by the filtering method of the vehicle speed filter at the control period immediately before the current control period and the minimum limit value, the vehicle speed filter may determine the value obtained by summing the filtered speed of the vehicle calculated by the filtering method of the vehicle speed filter at the control period immediately before the current control period and the minimum limit value as the filtered speed of the vehicle at the current control period by performing the first filtering method. When the speed of the vehicle at a current control period is greater than the value obtained by summing the filtered speed of the vehicle calculated by the filtering method of the vehicle speed filter at the control period immediately before the current control period and the maximum limit value, the vehicle speed filter may determine the value obtained by summing the filtered speed of the vehicle calculated by the filtering method of the vehicle speed filter at the control period immediately before the current control period and the maximum limit value as the filtered speed of the vehicle at the current control period by performing the first filtering method. When the value obtained by subtracting the speed of the vehicle at the current control period from the filtered speed of the vehicle calculated by the filtering method of the vehicle speed filter at the current control period is greater than a third filter coefficient, the vehicle speed filter may determine a value obtained by summing the speed of the vehicle at the current control period and the third filter coefficient as the filtered speed of the vehicle at the current control period by performing a second filtering method among the filtering methods of the vehicle speed filter, and the third filter coefficient may be the value that makes the target transmission ratio of the continuously variable transmission have a stable value. When the value obtained by subtracting the speed of the vehicle at the current control period from the filtered speed of the vehicle calculated by the filtering method of the vehicle speed filter at the current control period is less than the negative third filter coefficient, the vehicle speed filter may determine a value obtained by subtracting the third filter coefficient from the speed of the vehicle at the current control period as the filtered speed of the vehicle at the current control period by performing the second filtering method.

The transmission ratio calculator may calculate the target transmission ratio by using a value obtained by dividing a value of the target driving pulley speed signal by a value of a filtered driven pulley speed signal of the continuously variable transmission corresponding to the filtered speed signal of the vehicle.

The method and the device for filtering the target transmission ratio of the continuously variable transmission of the vehicle according to the exemplary form of the present disclosure stabilize (or filter) a target transmission ratio by suppressing undesired distortion of a vehicle speed signal due to vibration of a vehicle to improve a feeling of shifting of the vehicle, fuel efficiency of the vehicle, or durability of the vehicle (or continuously variable transmission).

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
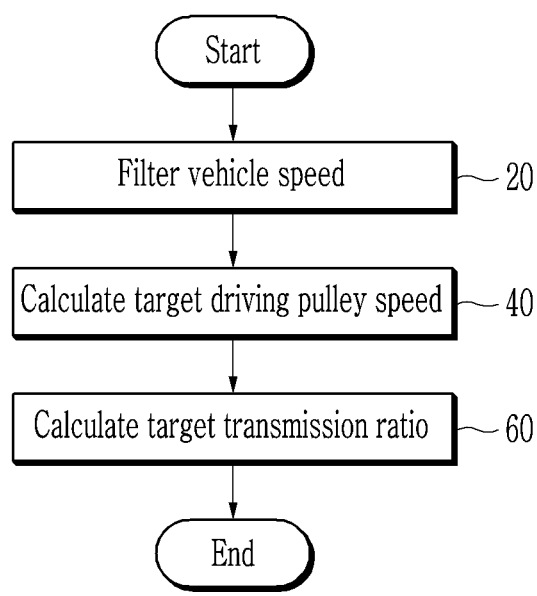
FIG. 1 is a flowchart for describing a method of filtering a target transmission ratio of a continuously variable transmission of a vehicle according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, the present disclosure will be described in detail by describing the exemplary form of the present disclosure with reference to the accompanying drawings. In the following description of the exemplary form, a detailed description of known configurations or functions incorporated herein will be omitted when it is judged that the detailed description may make the subject matter of the present disclosure unclear. Like reference numerals presented in each drawing designate like elements throughout the specification.

The term used in the present specification is simply used for describing a specific form and does not intend to limit the present disclosure. A singular expression includes a plural expression unless it is specifically described to the contrary in the context. In the present specification, it should be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

Throughout this specification, when it is described that an element is "coupled" to another element, the element may be "directly coupled" to the another element and "electrically or mechanically coupled" to the another element with a still another element interposed therebetween.

All terms used herein including technical or scientific terms have the same meanings as meanings which are generally understood by those skilled in the art to which the present disclosure pertains unless they are differently defined. Terms defined in a generally used dictionary shall be construed to have meanings matching those in the context of a related art, and shall not be construed as ideal or excessively formal meanings unless they are clearly defined in the present specification.

A target transmission ratio of a continuously variable transmission (CVT) of a vehicle according to a related technology is determined by a vehicle speed and a value of an acceleration pedal position sensor (APS) corresponding to a driver's will to accelerate.

When a vehicle is impacted or a powertrain (PT) of the vehicle vibrates due to a road surface condition of a road on which the vehicle travels, a driven pulley speed of the CVT corresponding to the vehicle speed may vibrate abnormally (or vibrate). Accordingly, undesired distortion of the target transmission ratio may occur, causing the shift control of the CVT to become unstable.

Figure 2:
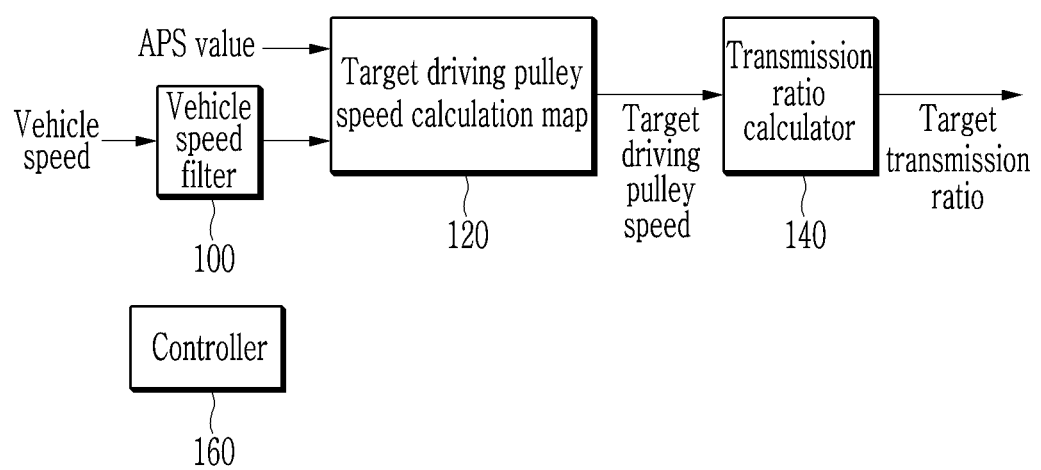
FIG. 2 is a block diagram illustrating a device for filtering a target transmission ratio of a continuously variable transmission of a vehicle to which the method of filtering a target transmission ratio of a continuously variable transmission of a vehicle illustrated in FIG. 1 is applied.
Figure 3:
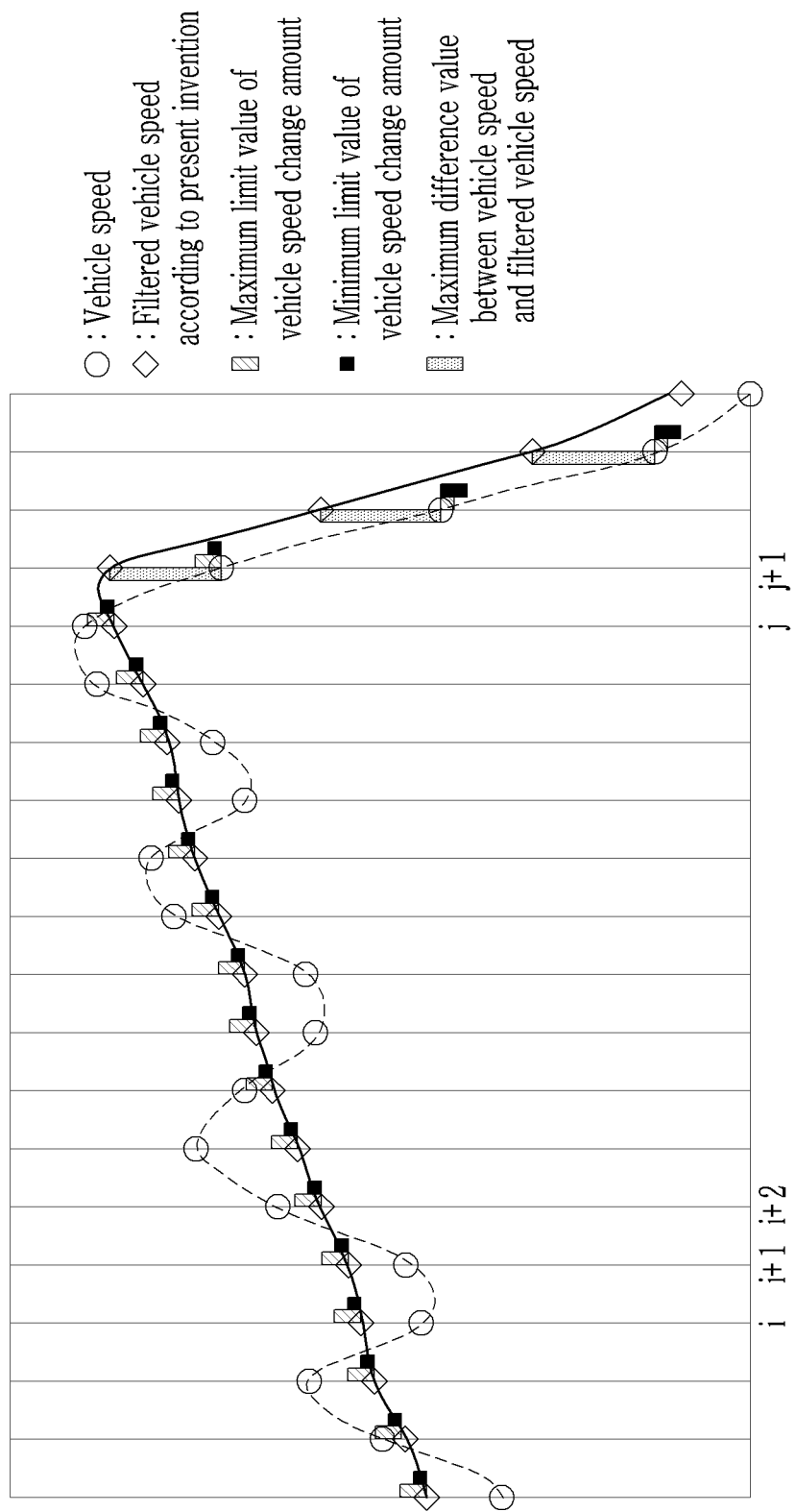
FIG. 3 is a diagram illustrating a filtered vehicle speed performed by a vehicle speed filter illustrated in FIG. 2.

FIG. 1 is a flowchart for describing a method of filtering a target transmission ratio of a continuously variable transmission of a vehicle according to an exemplary form of the present disclosure. FIG. 2 is a block diagram illustrating a device for filtering a target transmission ratio of a continuously variable transmission of a vehicle to which the method of filtering a target transmission ratio of a continuously variable transmission of a vehicle illustrated in FIG. 1 is applied. FIG. 3 is a diagram illustrating a filtered vehicle speed performed by a vehicle speed filter illustrated in FIG. 2.

Referring to FIGS. 1 to 3, in a filtering operation 20, a controller 160 may control a vehicle speed filter 100 so as to filter a speed signal of a vehicle distorted due to vibration of the vehicle. The speed signal of the vehicle may correspond to a driven pulley speed signal of the CVT. The driven pulley may transmit torque of the CVT to driving wheels of the vehicle.

An exemplary form of a first filtering method among the filtering methods performed by the vehicle speed filter 100 will be described below.

The vehicle speed filter 100 may set or calculate a maximum limit value of a change amount of the vehicle speed and a minimum limit value of the change amount of the vehicle speed by using Equations below.

Maximum limit value of change amount of vehicle speed=Differential value of vehicle speed+$A$ Minimum limit value of change amount of vehicle speed=Differential value of vehicle speed−$B$ In the Equations, A and B are the setting values (or filter coefficients) which make the target transmission ratio of the CVT have stable values by increasing filtering capability and a response speed of the vehicle speed filter 100, and may be determined by a test (or an experiment). When the values of A and B are small, a vibration component of the distorted speed signal of the vehicle may be largely removed and the amplitude of the speed signal of the vehicle may be greatly reduced. When the values of A and B are large, the vibration component of the distorted speed signal of the vehicle is less removed and the amplitude of the speed signal of the vehicle is less reduced, but a response speed of the vehicle speed filter 100 may increase and a difference between the distorted speed signal of the vehicle and the filtered speed signal of the vehicle may be decreased.

When a vehicle speed of a current control period i for filtering the distorted vehicle speed is equal to or larger than a value obtained by summing a filtered vehicle speed calculated by a filtering method of the vehicle speed filter 100 at a control period i−1 immediately before the current control period i and the minimum limit value of the change amount of the vehicle speed and is equal to or smaller than a value obtained by summing a filtered vehicle speed calculated by the filtering method of the vehicle speed filter 100 at the control period i−1 immediately before the current control period i and the maximum limit value of the change amount of the vehicle speed, the vehicle speed filter 100 may determine or calculate the filtered vehicle speed of the current control period i as the vehicle speed of the current control period i. An initial value of the filtered vehicle speed is the same as an initial value of the vehicle speed.

When the vehicle speed of the current control period i is less than the value obtained by summing the filtered vehicle speed calculated by the filtering method of the vehicle speed filter 100 at the control period i−1 immediately before the current control period i and the minimum limit value of the change amount of the vehicle speed, the vehicle speed filter 100 may determine or calculate the value obtained by summing the filtered vehicle speed calculated by the filtering method of the vehicle speed filter 100 at the control period i−1 immediately before the current control period i and the minimum limit value of the change amount of the vehicle speed as the filtered vehicle speed of the current control period i.

When the vehicle speed of the current control period i is larger than the value obtained by summing the filtered vehicle speed calculated by the filtering method of the vehicle speed filter 100 at the control period i−1 immediately before the current control period i and the maximum limit value of the change amount of the vehicle speed, the vehicle speed filter 100 may determine or calculate the value obtained by summing the filtered vehicle speed calculated by the filtering method of the vehicle speed filter 100 at the control period i−1 immediately before the current control period i and the maximum limit value of the change amount of the vehicle speed as the filtered vehicle speed of the current control period i.

An exemplary form of a second filtering method among the filtering methods performed by the vehicle speed filter 100 will be described below.

When a value obtained by subtracting the vehicle speed of the current control period i from the filtered vehicle speed calculated by the filtering method of the vehicle speed filter 100 at the current control period i is larger than a filter coefficient C having a positive value, the vehicle speed filter 100 may determine or calculate a value obtained by summing the vehicle speed of the current control period i and the filter coefficient C as the filtered vehicle speed of the current control period i.

When the value obtained by subtracting the vehicle speed of the current control period i from the filtered vehicle speed calculated by the filtering method of the vehicle speed filter 100 at the current control period i is less than a filter coefficient C (−C) having a negative value, the vehicle speed filter 100 may determine or calculate a value obtained by subtracting the filter coefficient C from the vehicle speed of the current control period i as the filtered vehicle speed of the current control period i.

C is the setting value which makes the target transmission ratio of the CVT have a stable value by increasing filtering capability and a response speed of the vehicle speed filter 100, and may be determined by a test (or an experiment). When the value of C is small, the response speed of the vehicle speed filter 100 may increase and the difference between the distorted speed signal of the vehicle and the filtered speed signal of the vehicle may be decreased. When the value of C is large, the vibration component of the distorted speed signal of the vehicle is removed a lot or the response speed of the vehicle speed filter 100 is decreased, and the amplitude of the speed signal of the vehicle is largely reduced, so that the difference between the distorted speed signal of the vehicle and the filtered speed signal of the vehicle may be increased.

When both the first filtering method and the second filtering method are simultaneously used, filtering capability and the response speed of the vehicle speed filter 100 may be increased.

The vehicle speed filter 100 may generate the filtered speed signal of the vehicle illustrated in FIG. 3 by decreasing the size of the speed signal of the vehicle to a size in which the target transmission ratio of the CVT has a stable value.

Referring to FIG. 3, it can be seen that the amplitude of the filtered vehicle speed signal is greatly reduced, so that a lot of the vibration components of the vehicle speed is removed, and the difference between the vehicle speed signal value and the filtered vehicle speed signal value is limited so as not to exceed the filter coefficient C, so that a generated speed (or output speed) of the filtered vehicle speed signal is increased and the difference between the vehicle speed signal and the filtered vehicle speed signal is decreased.

Figure 4:
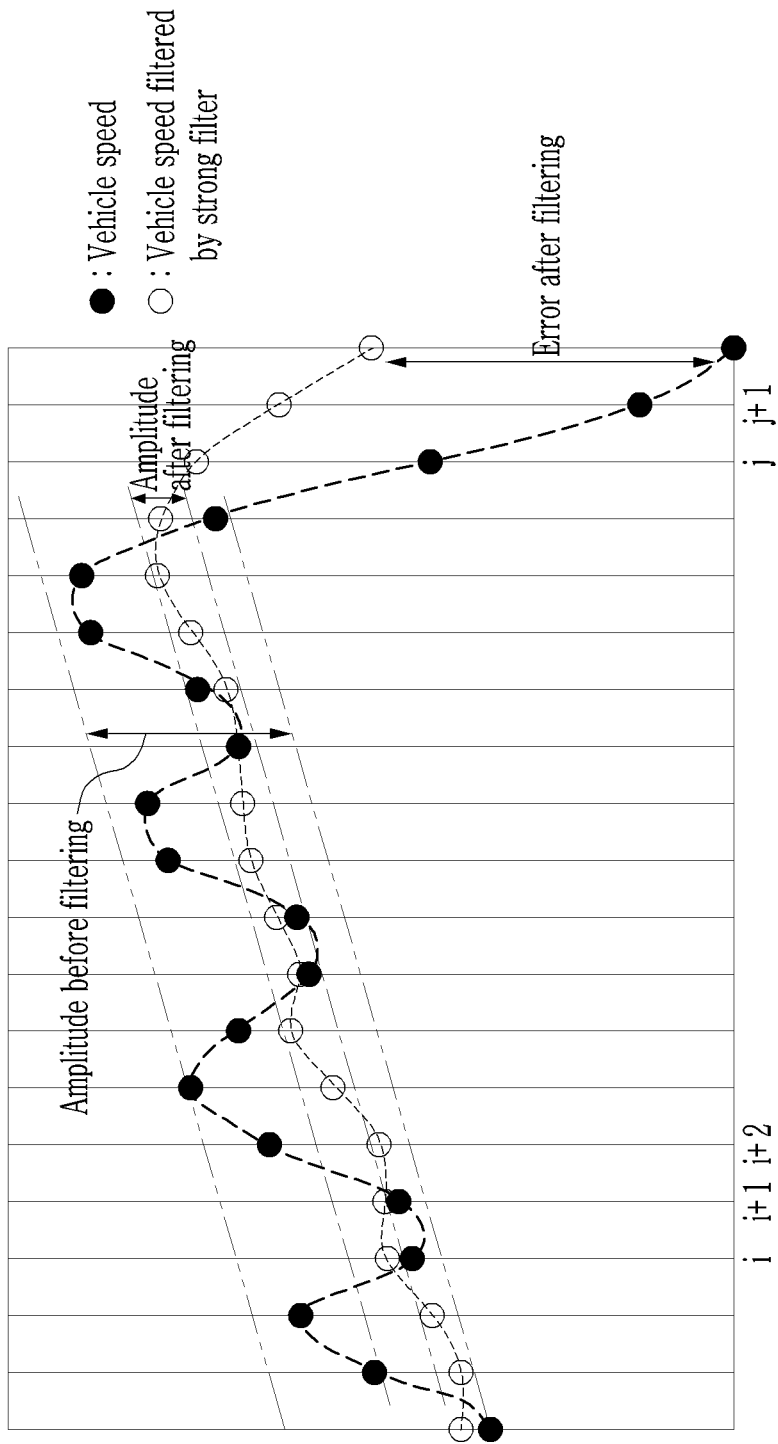
FIG. 4 is a diagram illustrating a vehicle speed filtered by a strong filter.

FIG. 4 is a diagram illustrating a vehicle speed filtered by a strong filter. Referring to FIG. 4, unlike the filtered vehicle speed signal illustrated in FIG. 3, it can be seen that the amplitude of the filtered vehicle speed signal is greatly reduced, so that a lot of vibration components of the vehicle speed signal is removed, but the generation speed of the filtered vehicle speed signal is decreased and a difference between the vehicle speed signal and the filtered vehicle speed signal may be increased.

As illustrated in FIG. 2, the device for filtering the target transmission ratio of the continuously variable transmission of the vehicle may include the vehicle speed filter 100, a target driving pulley speed calculation map (or a memory for storing a target driving pulley speed) 120, a transmission ratio calculator 140, and the controller 160.

The controller 160 is an electronic control unit (ECU), and may control the overall operation of the vehicle including the device for filtering the target transmission ratio of the continuously variable transmission. The controller 160 may be one or more microprocessors operated by a program (control logic) or hardware (for example, a microcomputer) including the microprocessor, and the program may include a series of instructions for performing the method of filtering the target transmission ratio of the continuously variable transmission of the vehicle according to an exemplary form of the present disclosure. The instruction may be stored in a memory of the vehicle or the controller 160.

According to an operation 40 illustrated in FIG. 1, the controller 160 may control a target driving pulley speed memory 120 so that the target driving pulley speed memory 120 outputs or calculates a target driving pulley speed signal of the CVT based on an output value of an acceleration pedal position sensor (APS) and the filtered speed signal of the vehicle.

The APS may continuously measure a position value of an acceleration pedal (the degree in which the accelerator pedal is depressed). When the accelerator pedal is completely depressed, the position value of the accelerator pedal may be 100%, and when the accelerator pedal is not depressed, the position value of the accelerator pedal may be 0%.

The target driving pulley speed signal according to the output value of the APS and the filtered speed signal of the vehicle stored in the target driving pulley speed memory 120 may be determined by a test (or experiment).

The driving pulley connected to the driven pulley through the belt may transmit the torque of the engine of the vehicle to the CVT. The CVT may perform the shifting operation while the diameter of the driving pulley and the diameter of the driven pulley are changed at the same time.

According to an operation 60, the controller 160 may control the transmission calculator 140 so as to calculate a target transmission ratio of the CVT based on the target driving pulley speed signal of the CVT and the filtered speed signal of the vehicle. For example, the transmission calculator 140 may calculate or filter the target transmission ratio by using a value obtained by dividing the value of the target driving pulley speed signal by the value of the filtered driven pulley speed signal of the CVT corresponding to the filtered speed signal of the vehicle. The method of filtering the driven pulley speed signal of the CVT may be similar to the method of filtering the speed signal of the vehicle.

The target transmission ratio may be used in a transmission ratio feedback control method of the CVT that stably maintains (follows) the target transmission ratio. The control signal output by the transmission ratio feedback control method may adjust a hydraulic pressure of the driving pulley and the hydraulic pressure of the driven pulley for the operation of the CVT.

The constituent element, " . . . unit", a block, or a module used in the exemplary form of the present disclosure may be implemented by software, such as a task, class, subroutine, process, object, execution thread, and program performed in a predetermined area of a memory, or hardware, such as field-programmable gate array (FPGA) or an application-specific integrated circuit (ASIC), and may also be implemented by a combination of the software and the hardware. The constituent element, " . . . unit" or the like may also be included in a computer readable storage medium, and a part thereof may be distributed in the plurality of computers.

As described above, the exemplary forms have been disclosed in the drawings and the specification. The specific terms used herein are for purposes of illustration, but are only used for the purpose of describing the present disclosure, and are not used to limit the meaning or the scope of the present disclosure described in the claims. Accordingly, those skilled in the art will appreciate that various modifications and equivalent forms may be made without departing from the scope and spirit of the present disclosure.

DESCRIPTION OF SYMBOLS

100: Vehicle speed filter
120: Target driving pulley speed memory
140: Transmission ratio calculator
160: Controller

What is claimed is:

1. A method of filtering a target transmission ratio of a continuously variable transmission of a vehicle, the method comprising:
   controlling, by a controller, a vehicle speed filter configured to filter a speed signal of the vehicle distorted due to vibration of the vehicle;
   controlling, by the controller, a target driving pulley speed memory configured to output a target driving pulley speed signal of the continuously variable transmission based on an output value of an acceleration pedal sensor and the filtered speed signal of the vehicle; and
   controlling, by the controller, a transmission ratio calculator configured to calculate a target transmission ratio of the continuously variable transmission that is a stable value based on the target driving pulley speed signal of the continuously variable transmission and the filtered speed signal of the vehicle,
   wherein the vehicle speed filter increases filtering capability and a response speed of the vehicle speed filter and decreases the speed signal of the vehicle to a value that makes the target transmission ratio of the continuously variable transmission stable.

2. The method of claim 1, wherein the speed signal of the vehicle corresponds to a driven pulley speed signal of the continuously variable transmission.

3. The method of claim 1, further comprising: in response to determining that a speed of the vehicle at a current control period is equal to or greater than a first value and is equal to or less than a second value, determining, by the vehicle speed filter, the filtered speed of the vehicle at the current control period as the speed of the vehicle at the current control period by performing a filtering method of the vehicle speed filter,
   wherein: the first value is obtained by summing the filtered speed of the vehicle calculated by a filtering method of the vehicle speed filter at a control period immediately before the current control period and a minimum limit value of a change amount of the speed of the vehicle,
   the second value is obtained by summing the filtered speed of the vehicle calculated by a filtering method of the vehicle speed filter at a control period immediately before the current control period and a maximum limit value of the change amount of the speed of the vehicle,
   the minimum limit value is determined based on a differential value of the speed of the vehicle at the current control period and a first filter coefficient that makes the target transmission ratio of the continuously variable transmission stable, and
   the maximum limit value is determined based on the differential value of the speed of the vehicle at the current control period and a second filter coefficient that makes the target transmission ratio of the continuously variable transmission stable.

4. The method of claim 1, further comprising: in response to determining that a speed of the vehicle at a current control period is less than a first value, determining, by the vehicle speed filter, the first value as a filtered speed of the vehicle at the current control period by performing a filtering method of the vehicle speed filter,
   wherein: the first value is obtained by summing the filtered speed of the vehicle calculated by the filtering method of the vehicle speed filter at the control period immediately before the current control period and a minimum limit value, and
   the minimum limit value is determined based on a differential value of the speed of the vehicle at the current control period and a first filter coefficient that makes the target transmission ratio of the continuously variable transmission stable.

5. The method of claim 1, further comprising: in response to determining that a speed of the vehicle at a current control period is greater than a first value, determining, by the vehicle speed filter, the first value as a filtered speed of the vehicle at the current control period by performing a filtering method of the vehicle speed filter,
 wherein: the first value is obtained by summing the filtered speed of the vehicle calculated by the filtering method of the vehicle speed filter at the control period immediately before the current control period and a maximum limit value, and
 the maximum limit value is determined based on a differential value of the speed of the vehicle at the current control period and a second filter coefficient that makes the target transmission ratio of the continuously variable transmission stable.

6. The method of claim 1, further comprising: in response to determining that a first value is larger than a third filter coefficient, determining, by the vehicle speed filter, a value obtained by summing a speed of the vehicle at a current control period and the third filter coefficient as a filtered speed of the vehicle at the current control period by performing a filtering method of the vehicle speed filter,
 wherein: the first value is obtained by subtracting the speed of the vehicle at the current control period from the filtered speed of the vehicle calculated by the filtering method of the vehicle speed filter at the current control period, and
 the third filter coefficient is a value that makes the target transmission ratio of the continuously variable transmission stable.

7. The method of claim 1, further comprising: in response to determining that a first value is less than a negative third filter coefficient, determining, by the vehicle speed filter, a value obtained by subtracting a third filter coefficient from a speed of the vehicle at a current control period as a filtered speed of the vehicle at the current control period by performing a filtering method of the vehicle speed filter,
 wherein the first value is obtained by subtracting the speed of the vehicle at the current control period from the filtered speed of the vehicle calculated by the filtering method of the vehicle speed filter at the current control period, and
 the third filter coefficient is a value that makes the target transmission ratio of the continuously variable transmission stable.

8. The method of claim 1, further comprising: calculating, by the transmission ratio calculator, the target transmission ratio by using a value obtained by dividing a value of the target driving pulley speed signal by a value of a filtered driven pulley speed signal of the continuously variable transmission corresponding to the filtered speed signal of the vehicle.

9. A device for filtering a target transmission ratio of a continuously variable transmission of a vehicle, the device comprising:
 a vehicle speed filter configured to filter a speed signal of the vehicle distorted due to vibration of the vehicle;
 a target driving pulley speed memory configured to output a target driving pulley speed signal of the continuously variable transmission based on an output value of an acceleration pedal sensor and the filtered speed signal of the vehicle;
 a transmission ratio calculator configured to calculate a target transmission ratio of the continuously variable transmission based on the target driving pulley speed signal of the continuously variable transmission and the filtered speed signal of the vehicle; and
 a controller configured to control the vehicle speed filter, the target driving pulley speed memory, and the transmission ratio calculator,
 wherein the vehicle speed filter increases filtering capability and a response speed of the vehicle speed filter and decreases the speed signal of the vehicle to a value that makes the target transmission ratio of the continuously variable transmission stable.

10. The device of claim 9, wherein the speed signal of the vehicle corresponds to a driven pulley speed signal of the continuously variable transmission.

11. The device of claim 9, wherein in response to determining that a speed of the vehicle at a current control period is equal to or greater than a first value and is equal to or less than a second value, the vehicle speed filter is configured to determine a filtered speed of the vehicle at the current control period as the speed of the vehicle at the current control period by performing a filtering method of the vehicle speed filter,
 wherein: the first value is obtained by summing the filtered speed of the vehicle calculated by a filtering method of the vehicle speed filter at a control period immediately before the current control period and a minimum limit value of a change amount of the speed of the vehicle,
 the second value is obtained by summing the filtered speed of the vehicle calculated by a filtering method of the vehicle speed filter at a control period immediately before the current control period and a maximum limit value of the change amount of the speed of the vehicle,
 the minimum limit value is determined based on a differential value of the speed of the vehicle at the current control period and a first filter coefficient that makes the target transmission ratio of the continuously variable transmission stable, and
 the maximum limit value is determined based on the differential value of the speed of the vehicle at the current control period and a second filter coefficient that makes the target transmission ratio of the continuously variable transmission stable.

12. The device of claim 9, wherein in response to determining that a speed of the vehicle at a current control period is less than a first value, the vehicle speed filter is configured to determine the first value as a filtered speed of the vehicle at the current control period by performing a filtering method of the vehicle speed filter,
 wherein: the first value is obtained by summing the filtered speed of the vehicle calculated by the filtering method of the vehicle speed filter at the control period immediately before the current control period and a minimum limit value and
 the minimum limit value is determined based on a differential value of the speed of the vehicle at the current control period and a first filter coefficient that makes the target transmission ratio of the continuously variable transmission stable.

13. The device of claim 9, wherein in response to determining that a speed of the vehicle at a current control period is greater than a first value, the vehicle speed filter is configured to determine the first value as a filtered speed of the vehicle at the current control period by performing a filtering method of the vehicle speed filter, wherein: the first value is obtained by summing the filtered speed of the vehicle calculated by the filtering method of the vehicle speed filter at the control period immediately before the current control period and a maximum limit value, and the maximum limit value is determined based on a differential value of the speed of the vehicle at the current control period and a second filter coefficient that makes the target transmission ratio of the continuously variable transmission stable.

14. The device of claim 9, wherein in response to determining that a first value is greater than a third filter coefficient, the vehicle speed filter is configured to determine a value obtained by summing a speed of the vehicle at a current control period and the third filter coefficient as a filtered speed of the vehicle at the current control period by performing a filtering method of the vehicle speed filter, wherein: the first value is obtained by subtracting the speed of the vehicle at the current control period from the filtered speed of the vehicle calculated by the filtering method of the vehicle speed filter at the current control period, and the third filter coefficient is a value that makes the target transmission ratio of the continuously variable transmission stable.

15. The device of claim 9, wherein in response to determining that a first value is less than a negative third filter coefficient, the vehicle speed filter is configured to determine a value obtained by subtracting a third filter coefficient from a speed of the vehicle at a current control period as a filtered speed of the vehicle at the current control period by performing a filtering method of the vehicle speed filter, wherein: the first value is obtained by subtracting the speed of the vehicle at the current control period from the filtered speed of the vehicle calculated by the filtering method of the vehicle speed filter at the current control period, and the third filter coefficient is a value that makes the target transmission ratio of the continuously variable transmission stable.

16. The device of claim 9, wherein the transmission ratio calculator is configured to calculate the target transmission ratio by using a value obtained by dividing a value of the target driving pulley speed signal by a value of a filtered driven pulley speed signal of the continuously variable transmission corresponding to the filtered speed signal of the vehicle.

\* \* \* \* \*